United States Patent
Cochran et al.

(10) Patent No.: US 7,366,866 B2
(45) Date of Patent: Apr. 29, 2008

(54) BLOCK SIZE ALLOCATION IN COPY OPERATIONS

(75) Inventors: Robert Alan Cochran, Sacramento, CA (US); Marcel Duvekot, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 10/699,318

(22) Filed: Oct. 30, 2003

(65) Prior Publication Data

US 2005/0097290 A1    May 5, 2005

(51) Int. Cl.
*G06F 12/00* (2006.01)

(52) U.S. Cl. .................. 711/171; 709/231; 710/33

(58) Field of Classification Search ............... 711/171; 710/33, 35; 709/231, 232
See application file for complete search history.

(56) References Cited

U.S. PATENT DOCUMENTS

| | | | | |
|---|---|---|---|---|
| 5,477,531 | A * | 12/1995 | McKee et al. | 370/249 |
| 6,006,289 | A * | 12/1999 | James et al. | 710/35 |
| 6,594,745 | B2 | 7/2003 | Grover | |
| 6,606,690 | B2 | 8/2003 | Padovano | |
| 6,678,812 | B1 * | 1/2004 | Begis et al. | 711/171 |
| 6,769,030 | B1 * | 7/2004 | Bournas | 709/233 |
| 2001/0015956 | A1 * | 8/2001 | Ono | 370/229 |
| 2002/0016827 | A1 | 2/2002 | McCabe et al. | |
| 2002/0103968 | A1 | 8/2002 | Grover | |
| 2002/0104008 | A1 | 8/2002 | Cochran et al. | |
| 2002/0186660 | A1 * | 12/2002 | Bahadiroglu | 370/248 |
| 2002/0199073 | A1 | 12/2002 | Tamura et al. | |
| 2003/0074492 | A1 | 4/2003 | Cochran | |
| 2003/0079092 | A1 | 4/2003 | Cochran et al. | |
| 2003/0079102 | A1 | 4/2003 | Lubbers et al. | |
| 2003/0084241 | A1 | 5/2003 | Lubbers et al. | |
| 2003/0120676 | A1 | 6/2003 | Holavanahalli et al. | |
| 2003/0145179 | A1 | 7/2003 | Gabber et al. | |
| 2003/0188114 | A1 * | 10/2003 | Lubbers et al. | 711/162 |
| 2004/0071166 | A1 * | 4/2004 | Yen et al. | 370/472 |

OTHER PUBLICATIONS

Tamboli, Chetan and Constantine N. Manikopoulos, "Determination of the Optimum Packet Length and Buffer Sizes for the Industrial Building Automation and Control Networks," Jul. 10, 1995, IEEE, Symposium on Industrial Electronics, vol. 2, pp. 831-836.*

The Authoritative Dictionary of IEEE Standards Terms, Dec. 2000, IEEE Press, 7th Edition, pp. 107 and 153 & 152.*

\* cited by examiner

*Primary Examiner*—Donald Sparks
*Assistant Examiner*—Matthew Bradley

(57) ABSTRACT

Described herein are exemplary storage network architectures and methods for block size allocation in copy operations. A copy operation from a first storage cell to a second storage cell is initiated. The copy operation initially utilizes a first write block size. The write block size is changed to utilize a second write block size, different from the first write block size, and a performance parameter is measured at the second write block size. The second write block size is maintained if the performance parameter exceeds a threshold.

15 Claims, 7 Drawing Sheets

BLOCK SIZE ALLOCATION IN COPY OPERATIONS

TECHNICAL FIELD

The described subject matter relates to electronic computing, and more particularly to systems and methods for managing storage in electronic computing systems.

BACKGROUND

Effective collection, management, and control of information has become a central component of modern business processes. To this end, many businesses, both large and small, now implement computer-based information management systems.

Data management is an important component of computer-based information management systems. Many users now implement storage networks to manage data operations in computer-based information management systems. Storage networks have evolved in computing power and complexity to provide highly reliable, managed storage solutions that may be distributed across a wide geographic area.

Distributed storage systems present particular storage management issues. Distributed storage systems implement multiple storage locations that may be separated by tens, hundreds, or even thousands of miles. The communication link(s) between storage sites may include one or more segments that are a part of a public communication network, rather than a dedicated, private communication network. These and other factors may create undesirable variability in the performance of data transmission operations between storage locations in a storage network. Effective management of data transmission operations between storage locations is desirable to maintain adequate performance levels in storage networks.

SUMMARY

In an exemplary implementation a method is provided. The method comprises initiating a copy operation from a first storage cell to a second storage cell, wherein the copy operation initially utilizes a first write block size; changing the write block size to utilize a second write block size, different from the first write block size; measuring a performance parameter at the second write block size; and maintaining the second block size if the performance parameter exceeds a threshold.

DETAILED DESCRIPTION

Described herein are exemplary storage network architectures and methods for block size allocation in copy operations. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Network Architecture

Figure 1:
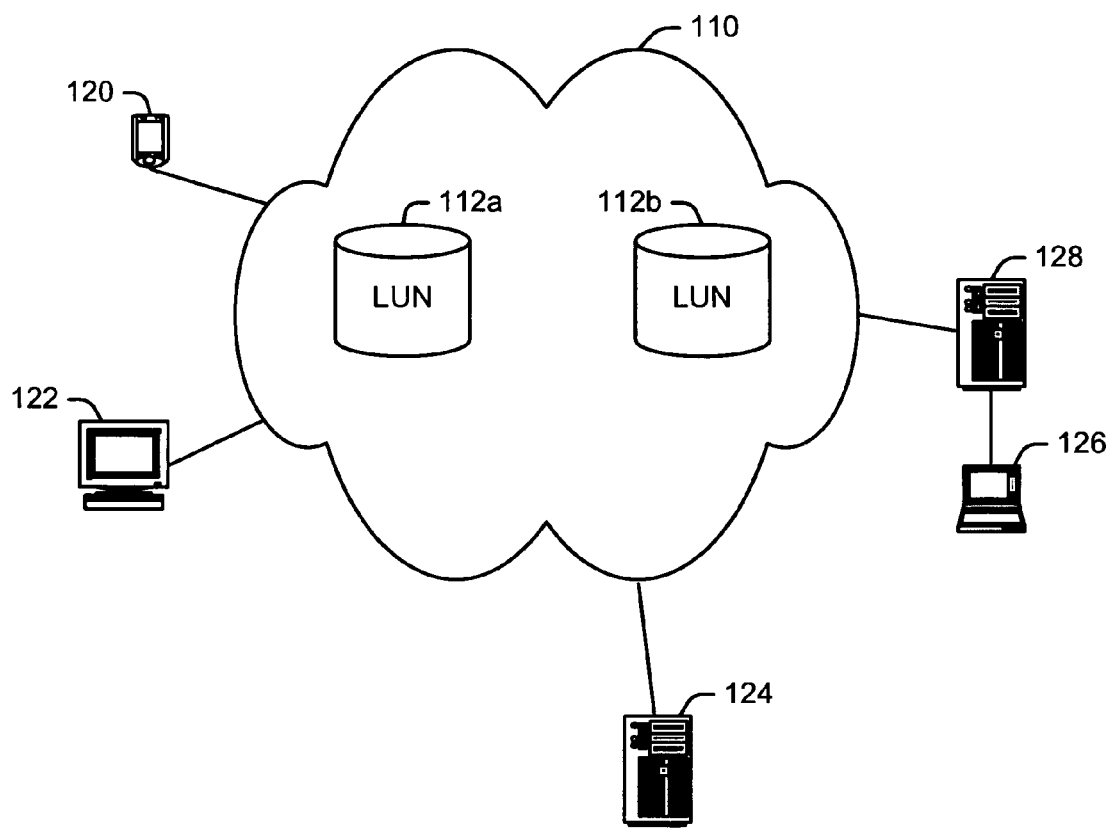
FIG. 1 is a schematic illustration of an exemplary implementation of a networked computing system that utilizes a storage network.

FIG. 1 is a schematic illustration of an exemplary implementation of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUNs) 112a, 112b may be allocated within storage pool 110. Each LUN 112a, 112b comprises a contiguous range of logical addresses that can be addressed by host devices 120, 122, 124 and 128 by mapping requests from the connection protocol used by the host device to the uniquely identified LUN 112. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which are also hosts, may logically couple directly to LUNs 112a, 112b. Hosts 120-128 may couple to multiple LUNs 112a, 112b, and LUNs 112a, 112b may be shared among multiple hosts. Each of the devices shown in FIG. 1 may include memory, mass storage, and a degree of data processing capability sufficient to manage a network connection.

Figure 2:
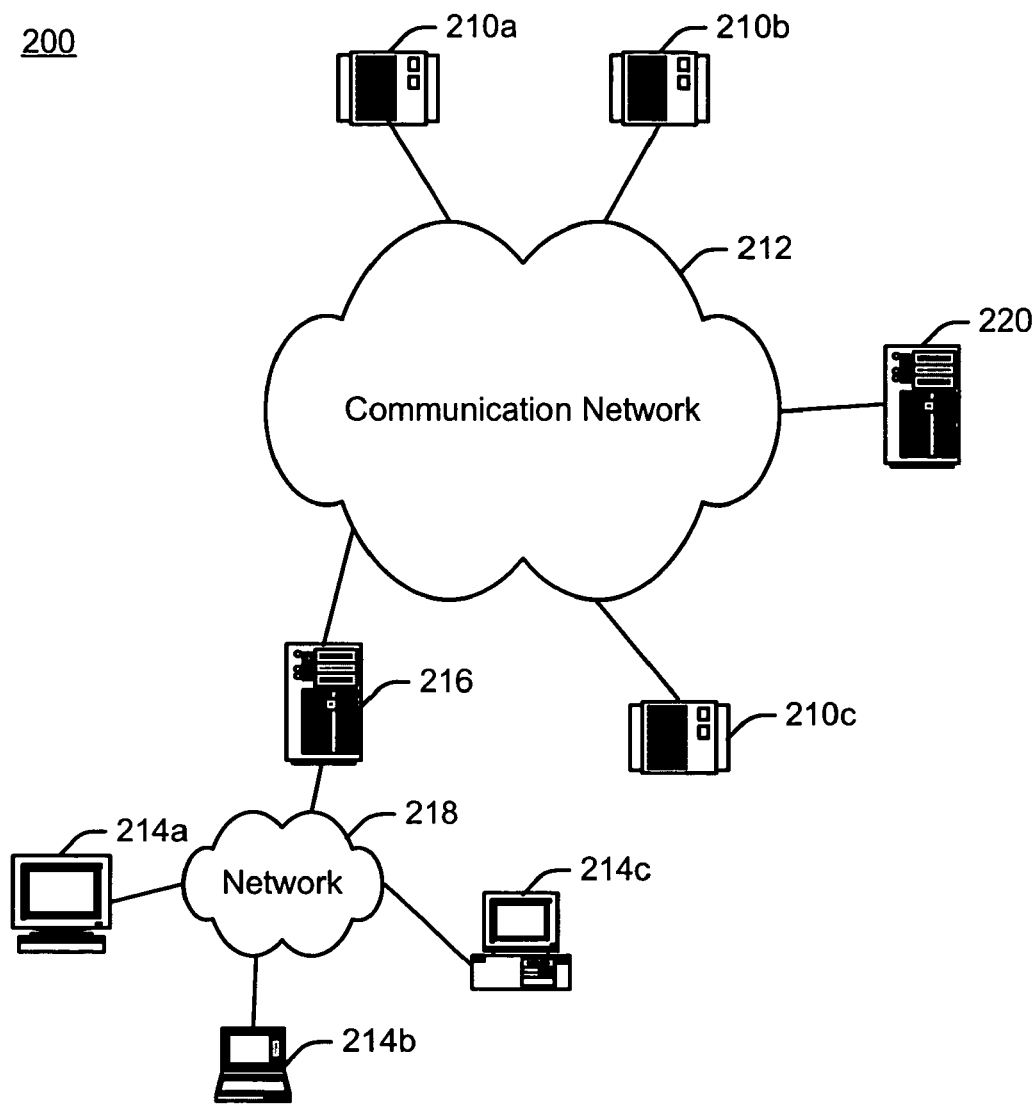
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available form Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. By way of example, a switching fabric comprising a single FC switch can interconnect 256 or more ports, providing a possibility of hundreds of storage cells 210a, 210b, 210c in a single storage network.

Figure 3:
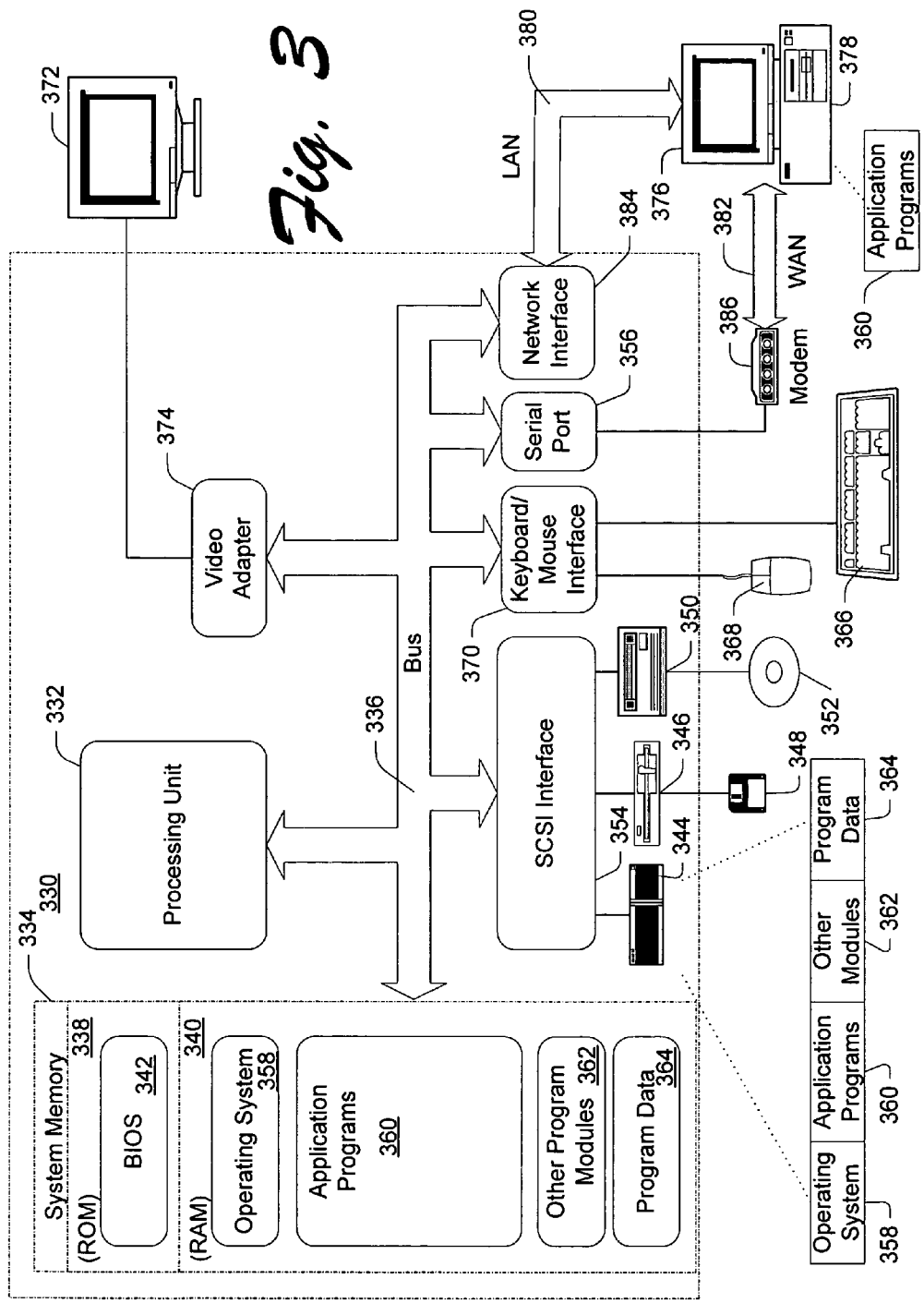
FIG. 3 is a schematic illustration of an exemplary implementation of a computing device that can be utilized to implement a host.

Hosts 216, 220 are typically implemented as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 4:
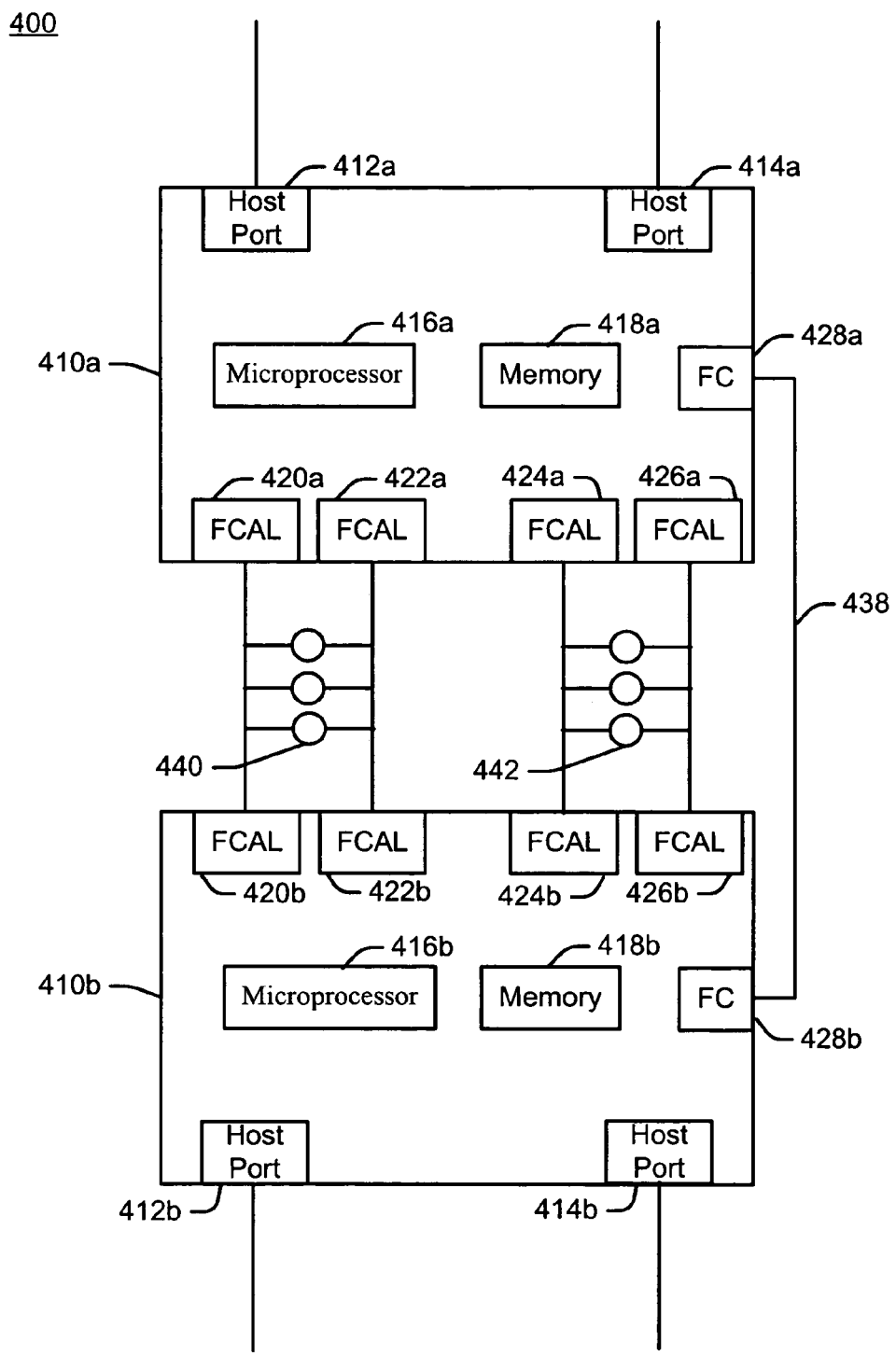
FIG. 4 is a schematic illustration of an exemplary implementation of a storage cell.

FIG. 4 is a schematic illustration of an exemplary implementation of a storage cell 400 that may be used to implement a storage cell such as 210a, 210b, or 210c. Referring to FIG. 4, storage cell 400 includes two Network Storage Controllers (NSCs), also referred to as disk controllers, 410a, 410b to manage the operations and the transfer of data to and from one or more disk arrays 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a, 422a, 424a, 426a and 420b, 422b, 424b, 426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric or a small computer serial interface (SCSI) connection may be used.

In operation, the storage capacity provided by the arrays of disk drives 440, 442 may be added to the storage pool 110. When an application requires storage capacity, logic instructions on a host computer 128 establish a LUN from storage capacity available on the arrays of disk drives 440, 442 available in one or more storage sites. It will be appreciated that, because a LUN is a logical unit, not necessarily a physical unit, the physical storage space that constitutes the LUN may be distributed across multiple storage cells. Data for the application is stored on one or more LUNs in the storage network. An application that needs to access the data queries a host computer, which retrieves the data from the LUN and forwards the data to the application.

Exemplary Copy Operations

Storage networks may implement remote copies of information stored in a LUN, e.g., to provide data redundancy. By way of example, referring to FIG. 2, a LUN resident on storage cell 210a may have a remote copy resident on storage cell 210b, which may be located a great distance from storage cell 210a. Additional remote copies of the LUN resident on storage cell 210a may be maintained on other storage cells in the storage network 210. Similarly, a LUN resident on storage cell 210b may have remote copies on storage cell 210a or 210c, and a LUN resident on storage cell 210c may have remote copies on storage cell 210a or 210b.

During the remote copy process the information in the LUN is transmitted across the switching fabric, sometimes referred to as a "network cloud" to its destination storage cell. Conventional remote copy procedures provide only limited control over data transfer parameters used in the remote copy process. In particular, conventional remote copy procedures permit only static, indirect control of the copy rate, e.g., by specifying the number of tracks to be copied at a time. In addition, conventional remote copy procedures increase the write block size without regard to deleterious effects of performance degradation in the communication link(s) between a "source" LUN and its remote copy, i.e., a "destination" LUN, typically due to resend requirements.

According to one implementation, these effects can be accommodated by adjusting the write block size in response to data transfer characteristics of the communication link(s) between a source LUN and its remote copy, i.e., a destination LUN. Remote copy operations may be initiated using conventional parameters, (e.g., 1-15 tracks at a time per LUN, plus multi-LUN aggregation up to 1 MB) and a "not to exceed" value. The write block size may be adjusted in response to real time transmission loss characteristics. As a communication link(s) becomes more consistently lossy, the write block size may be reduced. Conversely, as the transmission conditions improve, the write block size may be increased.

Figure 5:
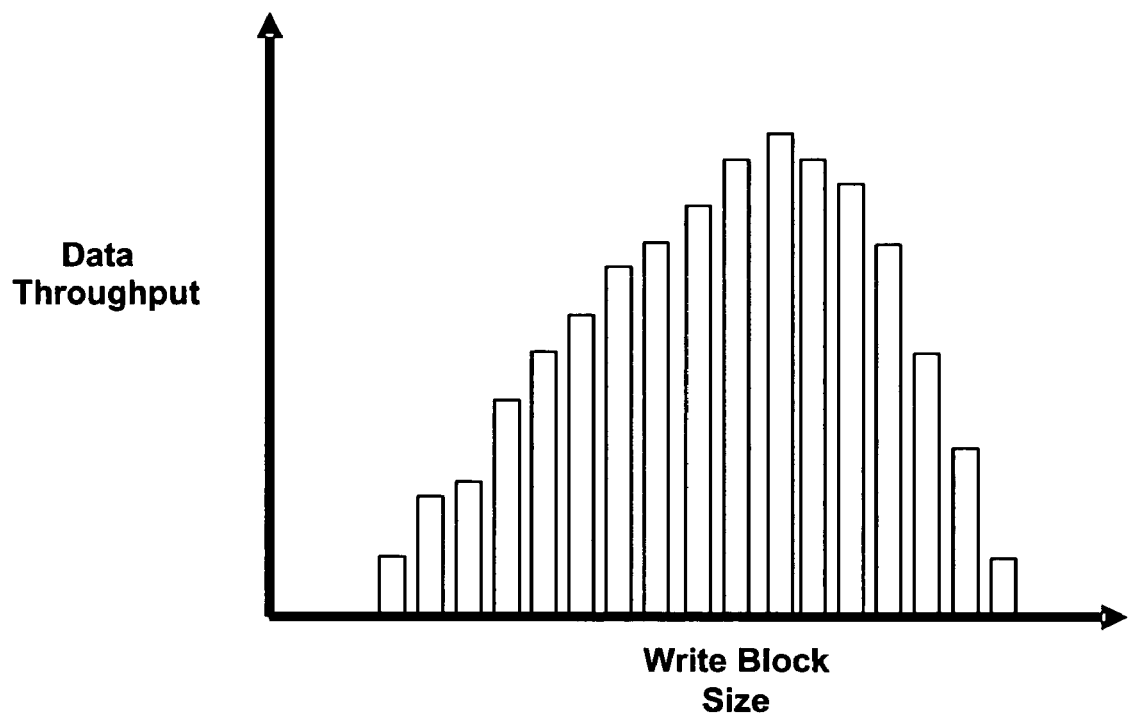
FIG. 5 is a graph illustrating the relationship between data throughput across a switching fabric and the write block size in an exemplary storage network.

FIG. 5 is a graph illustrating the relationship between data throughput across a switching fabric and the write block size in an exemplary storage network. Conventional remote copy operations take place at either one fixed block size or a very small finite set of block sizes (e.g., 512b to 64 KB). Inflexible block sizes and timeouts inhibit efficient data transfer in remote copy operations. If block sizes are too small, then protocol overhead penalties limit data throughput. This is represented by the ascending part of the bell curve. By contrast, if block sizes are set too high and the communication link(s) between the source and the destination are lossy, then re-transmissions of entire blocks due to a dropped packet(s) can reduce data throughput. This is represented by the descending part of the bell curve in FIG. 5. Adjusting the aggregated block size based on, e.g., a sliding window of average and/or recent link transmission characteristics, increases aggregated link throughput.

Figure 6:
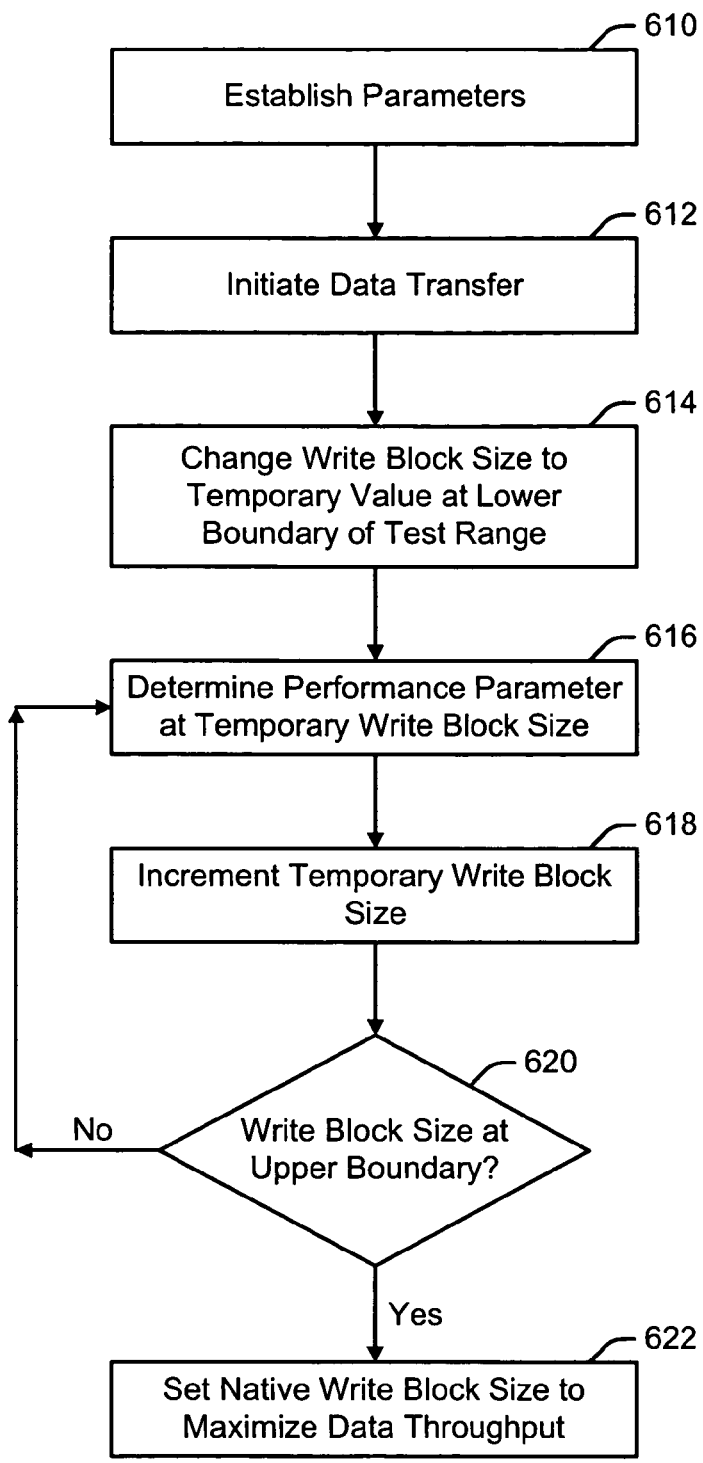
FIG. 6 is a flowchart illustrating operations in an exemplary method for dynamically adjusting the write block size.
Figure 7:
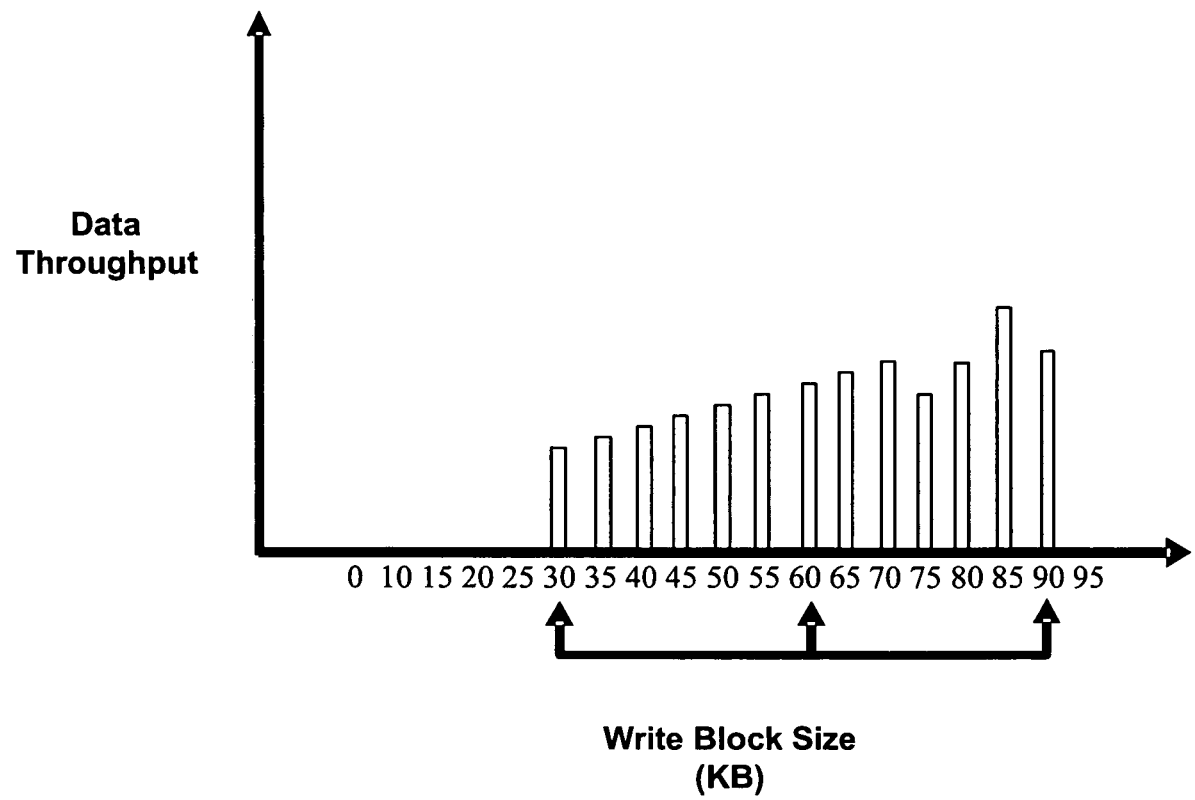
FIG. 7 is a graph illustrating the relationship between data throughput across a switching fabric and the write block size in an exemplary storage network.

Operation of an exemplary implementation of write block size adjustment will be explained with reference to FIG. 6 and FIG. 7. FIG. 6 is a flowchart illustrating operations in an exemplary method for adjusting the write block size during data transfer operations between storage cells such as, e.g., a remote copy operation. FIG. 7 is a graph illustrating a relationship between data throughput across a switching fabric and the write block size in an exemplary storage network. In an exemplary embodiment, the operations of FIG. 6 may be implemented on a processor associated with storage controller such as the microprocessor 416a, 416b on NSCs 410a, 410b. In alternate embodiments the operations of FIG. 6 may be implemented on any other processor associated with the storage network, e.g., a processor in a host computer.

An exemplary write block size adjustment involves periodically varying the write block size across a range of block sizes, evaluating the transmission throughput at a plurality of write block sizes within the selected range, and changing the write block size if one of the evaluated write block sizes satisfies a performance threshold. For convenience, this process is referred to herein as a Spectrum Sweep Throughput Probe (SSTP).

At operation 610 parameters are established for the SSTP. In an exemplary implementation seven parameters are established. For convenience, these parameters will be identified by consecutive letters beginning with A. The first time parameter, A, represents the time permitted to elapse between successive executions of the write block size adjustment process, i.e., A represents the amount of time transmission remains at a selected native write block size.

The second parameter, B, represents a range of write block sizes to evaluate. In an exemplary implementation, the parameter B may be implemented as a percentage of the native block size. For example, if the native block size is 60 KB and the parameter B is initially set to ±50%, then the SSTP tests block sizes from 35 KB to 90 KB. The third parameter, C, represents the step size by which the write block size is adjusted. The fourth parameter, D, represents the time duration for which data transmission is conducted at each increment in the range of write block sizes being evaluated.

Each of the parameters A, B, C, and D may be set to a constant value selected by a user of the system. For example the user may elect to execute an SSTP every five minutes that sweeps a range of ±50% of the native write block size in 512 byte increments, testing each write block size for thrity seconds. Alternatively, the parameters A, B, C, and D may be set to an initial value and adjusted during the data transfer operation based on one or more operating parameters. Exemplary operating parameters upon which the parameters A, B, C, and D may be adjusted include the performance of a communication link as measured by the data transmission rate or the round-trip travel time for packets transmitted between a source and a destination, or the volatility in data transmission throughput in the communication link(s).

The fifth parameter, E, represents a threshold percentage change in transmission conditions that causes an SSTP to be invoked. The parameter E may be a constant value selected by a user of the system. For example, the parameter E could be set such that a 20% drop in a performance parameter (e.g., data throughput, round-trip time) of a communication link causes a SSTP to be invoked. Alternatively, the parameter E may be set to an initial value and adjusted dynamically during the data transfer operation based on, e.g., the variation in data throughput over the communication link(s) or on performance requirements for the storage network.

The sixth parameter, F, represents a lower bound of the write block size, and the seventh parameter, G, represents and upper bound of the write block size. The parameters F and G may be constant values selected by a user of the system. For example, the parameter F could be set such that the native write block size never drops below 8 KB, and the parameter G could be set such that the native block size is never set above 1 MB. Alternatively, the parameters F and G may be set to an initial value and adjusted dynamically during the data transfer operation based on, e.g., the variation in data throughput over the communication link(s) or on performance requirements for the storage network.

At operation 612 data transfer is initiated between LUNs. The data transfer begins at the initial native block size. In an exemplary embodiment the initial native block size may be set to 60 KB per LUN, with a 1 MB aggregate, representing the activity of multiple LUNs. After the time parameter A elapses, or if transmission conditions change by an amount that satisfies the threshold E, then an SSTP is initiated. At operation 614 the transmission write block size is changed to the lower bound of the range established by the parameter B. Referring to the exemplary SSTP illustrated in FIG. 7, if the initial native block size was 60 KB, and the parameter B is set to ±50%, then at operation 614 the temporary write block size is reduced to 30 KB. At operation 616 a performance parameter is measured with the write block size at 30 KB and stored in a suitable memory location, e.g., an array in memory. Suitable performance parameters include the data throughput per unit time, i.e., the data transmission rate, the round trip-time transmission time, or another parameter that indicates the performance of the communication link. The write block size remains at 30 KB until the time duration represented by the parameter D elapses, whereupon the temporary write block size is incremented by the parameter C, at operation 618.

In an exemplary implementation the data throughput may be determined at a transmitting storage cell. The transmitting storage cell transmits a plurality of write blocks of a predetermined size to a receiving storage cell. The receiving storage cell returns an acknowledgment to the transmitting storage cell indicating that one (or more) write blocks were received by the receiving storage cell. Using this information, the transmitting storage cell can compute the data throughput from the transmitting storage cell to the receiving storage cell in a given unit of time. In alternate implementations the data throughput may be calculated at the receiving storage cell, or by a separate processing device communicatively connected to the first storage cell and the second storage cell.

At operation 620 it is determined whether the temporary write block size is greater than the upper bound represented by parameter B, e.g., by comparing the current write block size to the upper bound. If not, then control passes back to 616 and the performance parameter is measured at the updated temporary write block size and stored in a suitable memory location, e.g, an array in memory. The write block size remains at the updated temporary write block size until the time duration represented by the parameter D elapses, whereupon the temporary write block size is incremented by the parameter C, at operation 618.

The operations 616 through 620 are repeated until the temporary write block size exceeds the upper bound of the range established by the parameter B. Control is then passed to operation 622, where the native write block size is reset to maximize the data throughput. This may be implemented by scanning the array of throughput values in memory and resetting the native block size to the block size that exhibited the highest data transmission throughput. By way of example, the data transmission throughput in the example illustrated in FIG. 7 reached its peak at 85 KB. Accordingly, the native write block would be reset to 85 KB. The native block size remains fixed until the time parameter A elapses, or until link conditions change by an amount represented by the parameter E, triggering an SSTP.

It will be appreciated that the starting point for an SSTP may be selected arbitrarily. In the operations of FIG. 6 the SSTP begins at a lower bound and the write block size is incremented through a range of values. In an alternate embodiment the SSTP may begin at an upper bound and the write may be decremented through a range of values. Alternatively, the SSTP may begin at the current write block size and the write block size may be incremented or decremented to test write block sizes within a range.

In another alternate embodiment the operations illustrated in FIG. 6 may be modified slightly so a single storage space may be used to store only the write block size associated with the best performance parameter. This avoids maintaining an array of performance parameter values. In this embodiment, each time the temporary write block size is incremented and a performance parameter is determined at a new temporary write block size (operation 616), the performance parameter is compared with the performance parameter at the previous write block size. The new temporary write block size is recorded in memory only if the new performance parameter exceeds the previous performance parameter. After executing an SSTP, the memory location will contain the temporary write block size associated with the best performance parameter, and the native write block size may be set to the temporary write block size.

In another alternate embodiment the operations illustrated in FIG. 6 may be modified slightly so that no write block sizes are stored in memory. In this embodiment a copy operation is initiated using a first write block size, and a performance parameter is measured at the first write block size. The write block size is then changed to a second write block size, and a performance parameter is measured at the second write block size. The second write block size is maintained if the performance parameter measured at the second write block size exceeds a threshold such as, e.g., the performance parameter at the first write block size. This process may repeated by incrementing (or decrementing) the second write block size across a range of write block sizes.

After executing an SSTP, the write block size will be set to the value that maximizes the performance parameter.

Referring briefly to FIG. 7, an SSTP may not produce a smooth curve, for example because certain write block sizes may not be compatible with cache sizes or other infrastructure in a storage network. If at any time, the SSTP causes data throughput to dip beneath a lower bound, at which a full re-copy of all LUN pairs may be required, then the remainder of that particular SSTP may be aborted and write block size may be changed to the provide the best available throughput, based on the most successful recent test(s).

Write block sizes may be adjusted on an individual LUN basis, or in aggregate groups of LUNs, e.g., a data consistency group (DCG). If the write block size is adjusted in the aggregate for multiple LUNs, then conventional allocation routines can be used to budget the write blocks among the several LUNs and LUN groups after the aggregated write block size for a link has been determined. For example, write blocks may be allocated according to fairness routines or according to load balancing routines.

During the Initial Copy State (ICS) and Resync Copy State (RCS) states, any LUN in a group may have the same replication write size budget as the rest of the LUNs in its group. For instance, if the optimal aggregate write block size was currently 640 KB and the only contenders for link bandwidth were a single group of 10 LUNS, then each LUN would be allowed 64 KB writes, so all would complete their LUN copies at about the same time. Other examples would be more complex.

LUN pairs may also exist in the Paired Update State (PUS), in which host writes to the source LUN are transmitted to the remote copy LUN. When LUNs in the PUS state compete with LUNs in ICS or RCS states for available aggregate link bandwidth, allocation algorithms may favor PUS activity to keep up with ongoing user writes.

In addition to the specific embodiments explicitly set forth herein, other aspects and embodiments of the present invention will be apparent to those skilled in the art from consideration of the specification disclosed herein. It is intended that the specification and illustrated embodiments be considered as examples only, with a true scope and spirit of the invention being indicated by the following claims.

What is claimed is:

1. A method to manage a remote copy process between a first storage cell in a storage network and a second storage cell in a storage network, comprising:
   establishing at least one of a plurality of parameters associated with at least one characteristic of the remote copy process;
   establishing at least one of a plurality of parameters associated with a spectrum sweep throughput probe;
   initiating the remote copy process to copy data from a first logical unit in the first storage cell to a copy of the first logical unit in the second storage cell over the storage network, wherein the remote copy process copies data using an initial native block size; and
   performing the spectrum sweep throughput probe during the remote copy process when the characteristic of the remote copy process satisfies at least one of the plurality of parameters.

2. The method of claim 1, wherein establishing at least one of a plurality of parameters associated with at least one characteristic of the remote copy process comprises establishing at least one of:
   a range of write block sizes to be evaluated in the spectrum sweep throughput process;
   a step size by which a write block size is adjusted in the spectrum sweep throughput process;
   a time duration for which data transmission is conducted during a phase of the spectrum sweep throughput process;
   a lower bound of a write block size; and
   an upper bound of a write block size.

3. The method of claim 1, wherein establishing at least one of a plurality of parameters associated with at least one characteristic of the remote copy process comprises establishing at least one of:
   a time period permitted to elapse before a spectrum sweep throughput process is initiated; and
   a threshold change in transmission conditions associated with the remote copy process.

4. The method of claim 3, wherein a spectrum sweep throughput probe is initiated in response to a predetermined decrease in a data transfer performance parameter during the remote copy process.

5. The method of claim 1, wherein performing a spectrum sweep throughput probe during the remote copy process when the characteristic of the remote copy process satisfies at least one of the plurality of parameters comprises:
   performing copy operations from the first storage cell to the second storage cell for a plurality of time intervals, wherein each time interval utilizes a different write block size for a predetermined period of time;
   measuring a performance parameter at each of the time intervals; and
   selecting a block size for which the performance parameter exceeds a threshold; and
   continuing the remote copy with the selected block size.

6. A network element in a computer-based storage network, comprising:
   a network interface;
   a processor;
   a memory module; and
   a communication bus that provides a communication connection between the network interface, the processor, and the memory module, wherein the memory module comprises logic instructions that, when executed on the processor, cause the processor to manage a remote copy process between a first storage cell in a storage network and a second storage cell in a storage network by performing operations, comprising:
     establishing at least one of a plurality of parameters associated with at least one characteristic of the remote copy process;
     establishing at least one of a plurality of parameters associated with a spectrum sweep throughput probe;
     initiating the remote copy process to copy data from a first logical unit in the first storage cell to a copy of the first logical unit in the second storage cell over the storage network, wherein the remote copy process copies data using an initial native block size; and
     performing the spectrum sweep throughput probe during the remote copy process when the characteristic of the remote copy process satisfies at least one of the plurality of parameters.

7. The network element of claim 6, wherein the memory module further comprises logic instructions that, when executed on the processor, cause the processor to establish at least one of:
   a range of write block sizes to be evaluated in the spectrum sweep throughput process;

a step size by which a write block size is adjusted in the spectrum sweep throughput process;

a time duration for which data transmission is conducted during a phase of the spectrum sweep throughput process;

a lower bound of a write block size; and an upper bound of a write block size.

8. The network element of claim 7, wherein the memory module further comprises logic instructions that, when executed on the processor, cause the processor to establish at least one of:

a time period permitted to elapse before a spectrum sweep throughput process is initiated; and a threshold change in transmission conditions associated with the remote copy process.

9. The network element of claim 8, wherein the memory module further comprises logic instructions that, when executed on the processor, cause the processor to initiate a spectrum sweep throughput probe in response to a predetermined decrease in a data transfer performance parameter during the remote copy process.

10. The network element of claim 6, wherein performing a spectrum sweep throughput probe during the remote copy process when the characteristic of the remote copy process satisfies at least one of the plurality of parameters comprises:

performing copy operations from the first storage cell to the second storage cell for a plurality of time intervals, wherein each time interval utilizes a different write block size for a predetermined period of time;

measuring a performance parameter at each of the time intervals; and selecting a block size for which the performance parameter exceeds a threshold; and continuing the remote copy with the selected block size.

11. A computer program product comprising logic instructions stored on a computer readable medium which, when executed by a processor, configure the processor to manage a remote copy process between a first storage cell in a storage network and a second storage cell in a storage network by performing operations, comprising:

establishing at least one of a plurality of parameters associated with at least one characteristic of the remote copy process;

establishing at least one of a plurality of parameters associated with a spectrum sweep throughput probe;

initiating the remote copy process to copy data from a first logical unit in the first storage cell to a copy of the first logical unit in the second storage cell over the storage network, wherein the remote copy process copies data using an initial native block size; and performing the spectrum sweep throughput probe during the remote copy process when the characteristic of the remote copy process satisfies at least one of the plurality of parameters.

12. The computer program product of claim 11, wherein the memory module further comprises logic instructions that, when executed on the processor, cause the processor to establish at least one of:

a range of write block sizes to be evaluated in the spectrum sweep throughput process;

a step size by which a write block size is adjusted in the spectrum sweep throughput process;

a time duration for which data transmission is conducted during a phase of the spectrum sweep throughput process;

a lower bound of a write block size; and an upper bound of a write block size.

13. The computer program product of claim 12, wherein the memory module further comprises logic instructions that, when executed on the processor, cause the processor to establish at least one of:

a time period permitted to elapse before a spectrum sweep throughput process is initiated; and a threshold change in transmission conditions associated with the remote copy process.

14. The computer program product of claim 13, wherein the memory module further comprises logic instructions that, when executed on the processor, cause the processor to initiate a spectrum sweep throughput probe in response to a predetermined decrease in a data transfer performance parameter during the remote copy process.

15. The computer program product of claim 11, wherein performing a spectrum sweep throughput probe during the remote copy process when the characteristic of the remote copy process satisfies at least one of the plurality of parameters comprises:

performing copy operations from the first storage cell to the second storage cell for a plurality of time intervals, wherein each time interval utilizes a different write block size for a predetermined period of time;

measuring a performance parameter at each of the time intervals; and selecting a block size for which the performance parameter exceeds a threshold; and continuing the remote copy with the selected block size.

* * * * *

UNITED STATES PATENT AND TRADEMARK OFFICE
CERTIFICATE OF CORRECTION

PATENT NO. : 7,366,866 B2  
APPLICATION NO. : 10/699318  
DATED : April 29, 2008  
INVENTOR(S) : Robert Alan Cochran et al.

It is certified that error appears in the above-identified patent and that said Letters Patent is hereby corrected as shown below:

In column 6, line 57, delete "35" and insert -- 30 --, therefor.

Signed and Sealed this

Fifth Day of August, 2008

JON W. DUDAS  
*Director of the United States Patent and Trademark Office*